(12) United States Patent
Tsunekazu et al.

(10) Patent No.: US 10,953,920 B2
(45) Date of Patent: Mar. 23, 2021

(54) PARKING ASSIST APPARATUS, PARKING ASSIST METHOD, AND COMPUTER PROGRAM

(71) Applicant: PANASONIC INTELLECTUAL PROPERTY MANAGEMENT CO., LTD., Osaka (JP)

(72) Inventors: Tomohiro Tsunekazu, Tokyo (JP); Noriyuki Tani, Kanagawa (JP); Yuya Matsumoto, Tokyo (JP); Shota Akaura, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/722,791

(22) Filed: Dec. 20, 2019

(65) Prior Publication Data

US 2020/0207416 A1  Jul. 2, 2020

(30) Foreign Application Priority Data

Dec. 26, 2018 (JP) .............................. JP2018-242432

(51) Int. Cl.
| | |
|---|---|
| *B60Q 1/48* | (2006.01) |
| *G08G 1/14* | (2006.01) |
| *B62D 15/02* | (2006.01) |
| *G08G 1/16* | (2006.01) |
| *B60R 1/00* | (2006.01) |
| *B60Q 9/00* | (2006.01) |

(52) U.S. Cl.
CPC ......... *B62D 15/0275* (2013.01); *B60Q 9/005* (2013.01); *B60R 1/00* (2013.01); *B62D 15/028* (2013.01); *G08G 1/168* (2013.01); *B60R 2300/305* (2013.01); *B60R 2300/806* (2013.01); *B60R 2300/8086* (2013.01)

(58) Field of Classification Search
CPC .. B62D 15/0275; B62D 15/028; B60Q 9/005; B60R 1/00; B60R 2300/305; B60R 2300/806; B60R 2300/8086; G08G 1/168
See application file for complete search history.

(56) References Cited

U.S. PATENT DOCUMENTS

| | | | | |
|---|---|---|---|---|
| 2005/0203704 A1* | 9/2005 | Frank | ..................... | G08G 1/168 |
| | | | | 701/300 |
| 2016/0148514 A1* | 5/2016 | Iwami | ................... | B60W 30/06 |
| | | | | 340/932.2 |
| 2017/0371347 A1* | 12/2017 | Cohen | ................... | B60W 30/08 |

(Continued)

FOREIGN PATENT DOCUMENTS

JP  2014-121984  7/2014

OTHER PUBLICATIONS

Ma et al., Research on Automatic Parking Systems Based on Parking Scene Recognition (Year: 2017).*
Pavithra et al., Autonomous Self-Parking Robot (Year: 2018).*

*Primary Examiner* — Quang Pham
(74) *Attorney, Agent, or Firm* — Greenblum & Bernstein, P.L.C.

(57) ABSTRACT

A parking assist apparatus includes a one-way traffic determiner that determines whether or not a vehicle is located on a one-way road, and a parking processor that, when it is determined that the vehicle is located on the one-way road case, does not perform a vehicle control for parallel parking including a path through which the vehicle reverses.

18 Claims, 5 Drawing Sheets

(56) References Cited

U.S. PATENT DOCUMENTS

| | | | |
|---|---|---|---|
| 2018/0336782 A1* | 11/2018 | Chase | G05D 1/0088 |
| 2018/0370525 A1* | 12/2018 | Ayyappan | G06K 9/00812 |
| 2019/0092392 A1* | 3/2019 | Schut | B60R 1/00 |
| 2019/0101924 A1* | 4/2019 | Styler | G08G 1/0112 |
| 2019/0294897 A1* | 9/2019 | Cohen | G06K 9/00825 |
| 2020/0035093 A1* | 1/2020 | Kukkadapu | G08G 1/0112 |
| 2020/0223452 A1* | 7/2020 | Toda | B60W 10/04 |

\* cited by examiner

PARKING ASSIST APPARATUS, PARKING ASSIST METHOD, AND COMPUTER PROGRAM

TECHNICAL FIELD

The present invention relates to a parking assist apparatus, a parking assist method, and a computer program.

BACKGROUND ART

Conventionally, techniques to assist in parallel parking of a vehicle are known. For example, Patent Literature (hereinafter, referred to as "PTL") 1 discloses a pulling-out assist apparatus that prevents a parallel-parked vehicle from hitting an obstacle when the parallel-parked vehicle is pulled out.

CITATION LIST

Patent Literature

PTL 1
Japanese Patent Application Laid-Open No. 2014-121984

SUMMARY

A parking assist apparatus according to one aspect of the present disclosure includes: a one-way traffic determiner that determines whether or not a vehicle is located on a one-way road; and a parking processor that, when it is determined that the vehicle is located on the one-way road, does not perform a vehicle control for parallel parking including a path through which the vehicle reverses.

It should be noted that general or specific embodiments may be implemented as a system, a method, an integrated circuit, a computer program, or a storage medium, or any selective combination of a system, an apparatus, a method, an integrated circuit, a computer program, and a storage medium.

According to non-limiting examples of the present disclosure, it is possible to assist in parallel parking more appropriately depending on a road environment.

Additional benefits and advantages of one aspect of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Embodiments of the present disclosure will be described in detail below with appropriate reference to the accompanying drawings. However, any description detailed more than necessary may be omitted. For example, any detailed description of well-known matters and redundant descriptions on substantially the same configurations may be omitted. This is to avoid the unnecessary redundancy of the following description and to facilitate understanding by those skilled in the art.

Note that, the accompanying drawings and the following description are provided to enable those skilled in the art to fully understand the present disclosure, but are not intended to limit the claimed subject.

Figure 1:
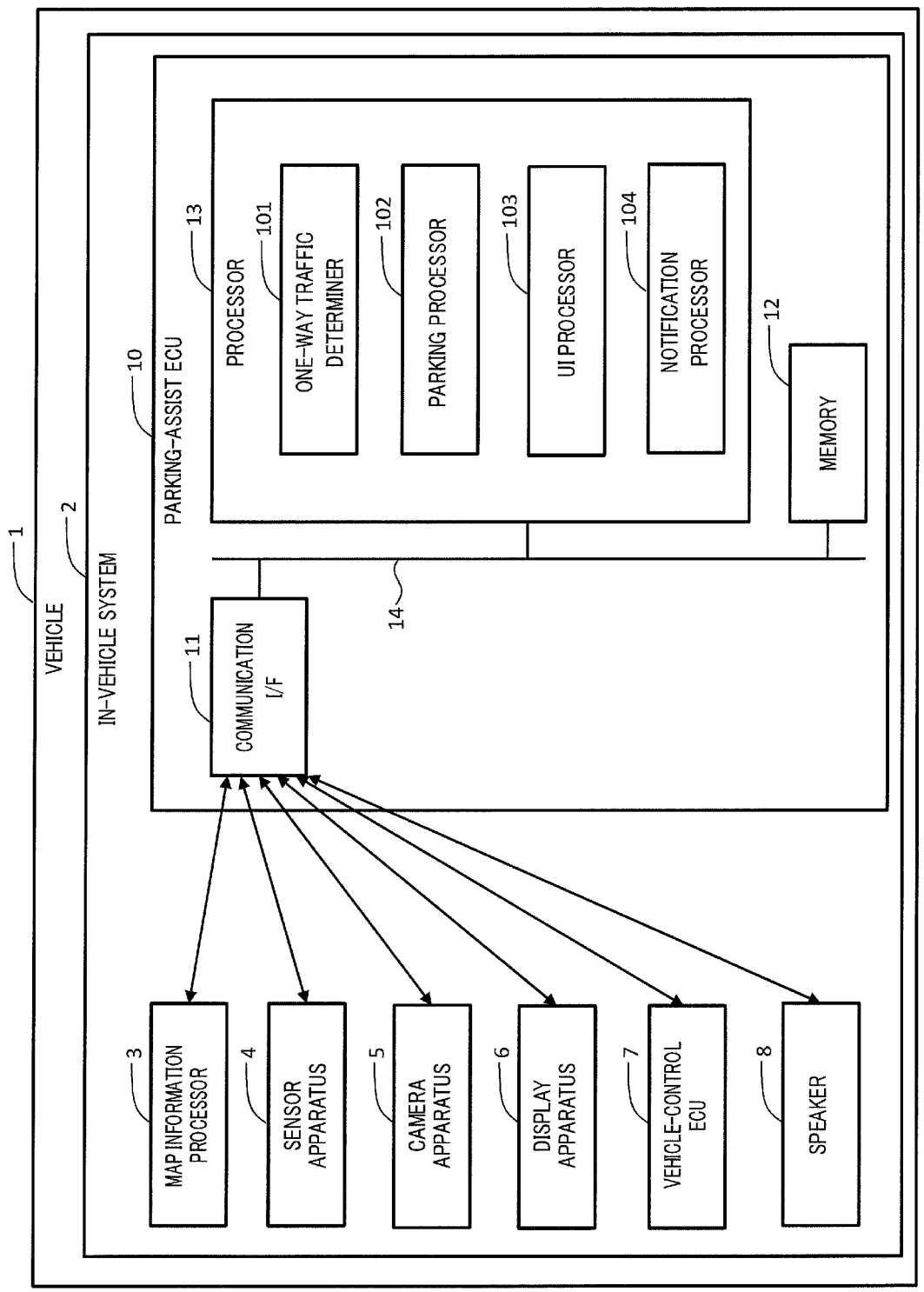
FIG. 1 is a block diagram of an exemplary configuration of an in-vehicle system according to an embodiment of the present disclosure.

FIG. 1 is a block diagram of an exemplary configuration of an in-vehicle system according to an embodiment of the present disclosure.

As illustrated in FIG. 1, in-vehicle system 2 mounted in vehicle 1 includes map information processor 3, sensor apparatus 4, camera apparatus 5, display apparatus 6, vehicle-control Electronic Control Unit (ECU) 7, speaker 8, and parking-assist ECU 10, for example.

Map information processor 3 identifies road information on the current position of vehicle 1 on the basis of a method for computing the current position of vehicle 1 (e.g., Global Positioning System (GPS)), and on the basis of map information held and/or downloaded. The road information includes information on road traffic laws and regulations. Examples of the information on the road traffic laws and regulations include one-way traffic, parking prohibition, or right-turn prohibition.

Sensor apparatus 4 is installed, for example, in the front, rear, left, and right of vehicle 1, transmits an electromagnetic wave (e.g., millimeter wave), and detects an object (person, another vehicle, obstacle, or the like) neighboring vehicle 1 on the basis of the reflected electromagnetic wave.

Camera apparatus 5 is installed, for example, in the front, rear, left, and right of vehicle 1, and detects the object neighboring vehicle 1 on the basis of a captured image. Note that, sensor apparatus 4 and camera apparatus 5 are one example of an apparatus for detecting the object neighboring vehicle 1, and vehicle 1 may detect the object also with an apparatus different from these apparatuses.

Display apparatus 6 is one example of a displaying apparatus, and displays information in the faun of an image and/or a character for a driver or a passenger. Display apparatus 6 may also have a function to receive an input from the driver or the passenger. That is, display apparatus 6 may serve also as an input apparatus.

Vehicle-control ECU 7 is an apparatus for controlling movements of vehicle 1. Vehicle-control ECU 7 may control steering, an accelerator, a brake, and the like of vehicle 1 to move vehicle 1 autonomously. Vehicle-control ECU 7 may assist the driver in performing a driving control of vehicle 1.

Speaker 8 notifies the driver or the passenger of voice information.

Parking-assist ECU 10 is an apparatus that assists in parking of vehicle 1. Parking-assist ECU 10 includes communication I/F 11, memory 12, and processor 13, for example. Communication I/F 11, memory 12, and processor 13 are connected to internal bus 14 capable of bidirectional communication.

Communication I/F 11 transmits or receives data to or from each of map information processor 3, sensor apparatus 4, camera apparatus 5, display apparatus 6, vehicle-control ECU 7, and speaker 8 through an in-vehicle network. The in-vehicle network may be composed of either a wired network or a wireless network, or, of a combination thereof. Also, the in-vehicle network may at least partly be composed of a Controller Area Network (CAN).

Memory 12 holds a computer program to be executed by processor 13, data, and the like. Memory 12 is composed of a volatile memory or a nonvolatile memory, or a combination thereof.

Processor 13 implements various functions of parking-assist ECU 10 by reading the computer program from memory 12 and executing the computer program. Processor 13 may be expressed as a Central Processing Unit (CPU), Large Scale Integration (LSI), or controller.

For example, processor 13 implements functions related to one-way traffic determiner 101, parking processor 102, UI processor 103, and notification processor 104 by executing the computer program read out from memory 12.

One-way traffic determiner 101 determines whether or not vehicle 1 is located on a one-way road. For example, one-way traffic determiner 101 obtains the road information on the current position of vehicle 1 from map information processor 3, and determines whether or not the current position of vehicle 1 is located on the one-way road on the basis of the obtained road information. Alternatively, one-way traffic determiner 101 obtains the captured image from camera apparatus 5, and determines whether or not the current position of vehicle 1 is located on the one-way road on the basis of a road sign included in the obtained captured image.

When one-way traffic determiner 101 determines that vehicle 1 is located on the one-way road, parking processor 102 judges not to perform a vehicle control for parallel parking including a path through which vehicle 1 reverses. For example, when one-way traffic determiner 101 determines that the current position of vehicle 1 is not located on the one-way road, parking processor 102 judges to perform the vehicle control for parallel parking including reversing. On the other hand, when one-way traffic determiner 101 determines that the current position of vehicle 1 is located on the one-way road, parking processor 102 judges not to perform the vehicle control for parallel parking including reversing. In this case, parking processor 102 may also judge to perform the vehicle control for parallel parking not including reversing. Performing the parallel parking including reversing of vehicle 1 on the one-way road can thus be prevented.

Moreover, when one-way traffic determiner 101 determines that vehicle 1 is not located on the one-way road, parking processor 102 may search for a space available for parallel parking. On the other hand, when one-way traffic determiner 101 determines that vehicle 1 is located on the one-way road, parking processor 102 may search for a space available for parallel parking performed by the vehicle control not including reversing.

Parking processor 102 may also search for the aforementioned space available for parallel parking, by analyzing the reflected wave of sensor apparatus 4, the captured image of camera apparatus 5, and/or the like while moving vehicle 1 forward at a low speed. Parking processor 102 may then perform the vehicle control in cooperation with vehicle-control ECU 7 while recognizing the object neighboring vehicle 1 in cooperation with sensor apparatus 4 and camera apparatus 5, so as to autonomously parallel park vehicle 1 in the space detected by the aforementioned search.

Note that, when there is a travel path leading to the detected space and including turning the steering wheel of vehicle 1 in opposite directions, parking processor 102 may determine the space to be a space available for parallel parking performed by the vehicle control including traveling forward and reversing. Note also that, when there is a travel path leading to the detected space and not including turning the steering wheel of vehicle 1 in opposite directions (e.g., including only traveling forward), parking processor 102 may determine the space to be a space available for parallel parking performed by the vehicle control not including reversing.

UI processor 103 generates parking-space selection UI 300 (see FIGS. 3 and 4) for the driver to select the space for parallel parking, and displays it on display apparatus 6. For example, among the spaces available for parallel parking which are detected by parking processor 102, UI processor 103 may cause, not to be displayed or selectable on parking-space selection UI 300, the space available for parallel parking performed by the vehicle control including reversing, when one-way traffic determiner 101 determines that vehicle 1 is located on the one-way road. UI processor 103 may also display on parking-space selection UI 300 that the road on which vehicle 1 is located is for one-way traffic, when one-way traffic determiner 101 determines that vehicle 1 is located on the one-way road. It is thus possible for the driver to understand that the parallel parking including reversing is not performed since the road on which vehicle 1 is located is for one-way traffic. Parking-space selection UI 300 will be described in detail below (see FIGS. 3 and 4).

When one-way traffic determiner 101 determines that vehicle 1 is located on the one-way road, notification processor 104 provides voice notification through speaker 8 that vehicle 1 does not perform the vehicle control for parallel parking including the path through which vehicle 1 reverses.

Next, a description will be given of one example of parallel parking processing according to the present embodiment with reference to the flowchart of FIG. 2.

When the driver touches the parallel-parking start button displayed on display apparatus 6 (S101), one-way traffic determiner 101 determines whether or not vehicle 1 is located on the one-way road (S102).

When it is determined at S102 that vehicle 1 is not located on the one-way road (S102: NO), parking processor 102 starts to search for the space available for parallel parking (S103). For example, parking processor 102 searches for the space available for parallel parking by traveling forward and reversing in combination (that is, by turning the steering wheel in opposite directions).

On the other hand, when it is determined at S102 that vehicle 1 is located on the one-way road (S102: YES), parking processor 102 starts to search for the space available for parallel parking performed by the vehicle control not including reversing (S104). For example, parking processor 102 searches for the space available for parallel parking only by traveling forward (that is, without turning the steering wheel in opposite directions).

When the space available for parallel parking is detected by the search at S103 or S104, UI processor 103 displays parking-space selection UI 300 on display apparatus 6 (S105). Parking-space selection UI 300 will be described in detail below (see FIGS. 3 and 4).

When the driver selects the space for parking via parking-space selection UI 300 (S106), parking processor 102 controls vehicle 1 such that vehicle 1 is parallel parked in the space for parking selected at S106 (S107).

Parallel parking not including reversing is performed on the one-way road according to the processing described above, so that it is possible to achieve appropriate assistance for parallel parking depending on the road environment.

Next, one example of parking-space selection UI 300 in the case where vehicle 1 is not located on the one-way road will be described with reference to FIG. 3. That is, FIG. 3 illustrates the example of parking-space selection UI 300 in the case where spaces available for parallel parking performed by the vehicle control including at least one of traveling forward and reversing are detected in the search at S103 shown in FIG. 2.

When parking processor 102 detects at least one space available for parallel parking performed by the vehicle control including at least one of traveling forward and reversing, UI processor 103 displays, over the detected space, parking-allowance mark 301 indicating that parking is allowed there. This parking-allowance mark 301 may be selected by the driver.

When the driver selects one parking-allowance mark 301, parking processor 102 may control vehicle 1 such that vehicle 1 is parallel parked in the space of the selected parking-allowance mark 301. This vehicle control may include any of traveling forward and reversing.

It is thus possible for the driver to select the space for parallel parking of vehicle 1 via parking-space selection UI 300.

Note that, UI processor 103 may display travel path 302 for parallel parking and other parked vehicles 303 on parking-space selection UI 300 as illustrated in FIG. 3.

Next, one example of parking-space selection UI 300 in the case where vehicle 1 is located on the one-way road will be described with reference to FIG. 4. That is, FIG. 4 illustrates the example of parking-space selection UI 300 in the case where the space available for parallel parking performed by the vehicle control not including reversing is detected in the search at S104 shown in FIG. 2.

When parking processor 102 detects at least one space available for parallel parking performed by the vehicle control not including reversing, UI processor 103 displays parking-allowance mark 301 over the detected space. This parking-allowance mark 301 may be selected by the driver.

When the driver selects one parking-allowance mark 301, parking processor 102 may control vehicle 1 such that vehicle 1 is parallel parked in the space of the selected parking-allowance mark 301. This vehicle control does not include reversing.

Figure 4:
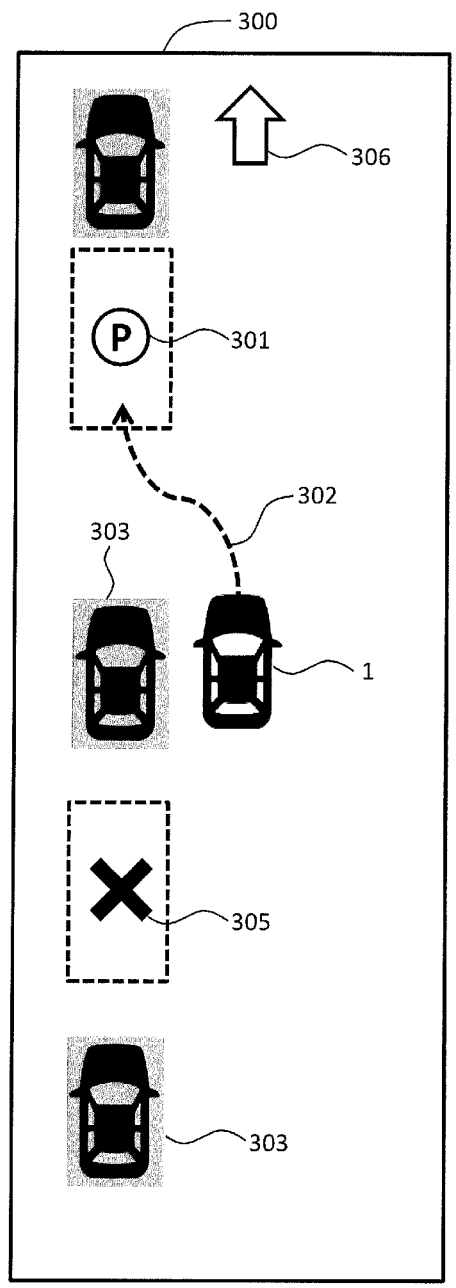
FIG. 4 illustrates a display example of the parking-space selection UI according to the present embodiment in a case where the vehicle is located on the one-way road.

In addition, when vehicle 1 is located on the one-way road, UI processor 103 may display parking-prohibition mark 305 as illustrated in FIG. 4 (this parking-prohibition mark 305 indicates that parking is prohibited there) over the space available for parallel parking performed by the vehicle control including reversing but unavailable in the case of the vehicle control not including reversing. UI processor 103 may also display one-way traffic mark 306 indicating that the road for the current position is for one-way traffic. Displaying these marks 305 and 306 makes it possible for the driver to understand that parallel parking including reversing cannot be performed since the road for the current position is for one-way traffic.

(Modification)

Note that, parking-assist ECU 10 according to the present embodiment is not limited to such parking-assist ECU 10 as described above. For example, parking-assist ECU 10 may also operate as follows.

Figure 5A:
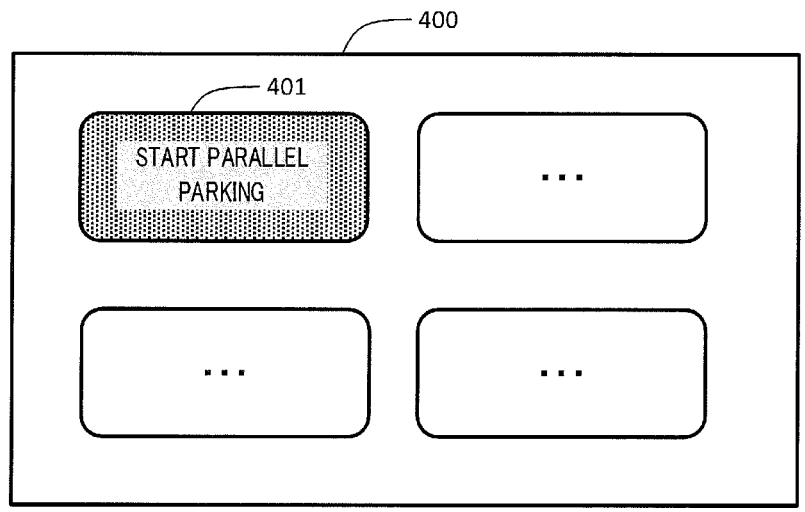
FIG. 5A illustrates Example 1 of an aspect of a displayed disabled parallel-parking start button according to the present embodiment.
Figure 5B:
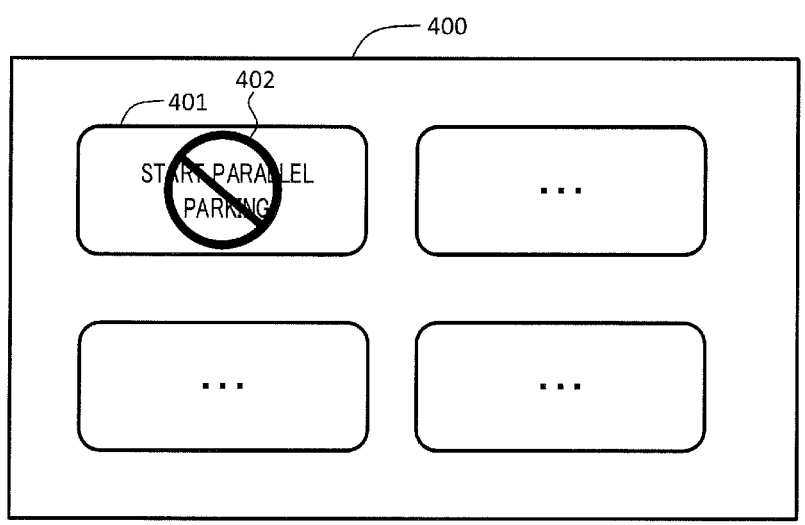
FIG. 5B illustrates Example 2 of the aspect of the displayed disabled parallel-parking start button according to the present embodiment.

When one-way traffic determiner 101 determines that vehicle 1 is located on the one-way road, parking processor 102 does not have to perform the vehicle control for parallel parking. In this case, notification processor 104 may provide voice notification through speaker 8 that the vehicle control for parallel parking is not performed. Also in this case, UI processor 103 may display the parallel-parking start button of S101 with an aspect indicating that the parallel-parking start button is disabled. For example, for the aspect indicating that the parallel-parking start button is disabled, UI processor 103 may display grayed-out parallel-parking start button 401 in operation screen 400 provided for receiving the start operation of the vehicle control for parallel parking as illustrated in FIG. 5A. Alternatively, for the aspect indicating that the parallel-parking start button is disabled, UI processor 103 may also display selection prohibition icon 402 over parallel-parking start button 401 in operation screen 400 as illustrated in FIG. 5B. This configuration does not allow the vehicle control for parallel parking when vehicle 1 is located on the one-way road, thereby making it possible to prevent the vehicle control including reversing on the one-way road. Also, the voice notification from speaker 8 and/or the aspect of the displayed parallel-parking start button allow the driver to recognize that the vehicle control for parallel parking is not performed.

Additionally or alternatively, when one-way traffic determiner 101 determines that vehicle 1 is located on the one-way road, parking processor 102 may also search for a space ahead of vehicle 1 available for parallel parking only by traveling forward, and may compute the travel path of vehicle 1 to the space when the space is detected. When one-way traffic determiner 101 determines that vehicle 1 is not located on the one-way road, parking processor 102 may also search for a space available for parallel parking obliquely ahead of vehicle 1 in searching for the space available for parallel parking. This configuration allows reduction in number of spaces for which the travel path is to be computed, thus allowing reduction in arithmetic amount of parking-assist ECU 10 in the case of the one-way road.

Figure 2:
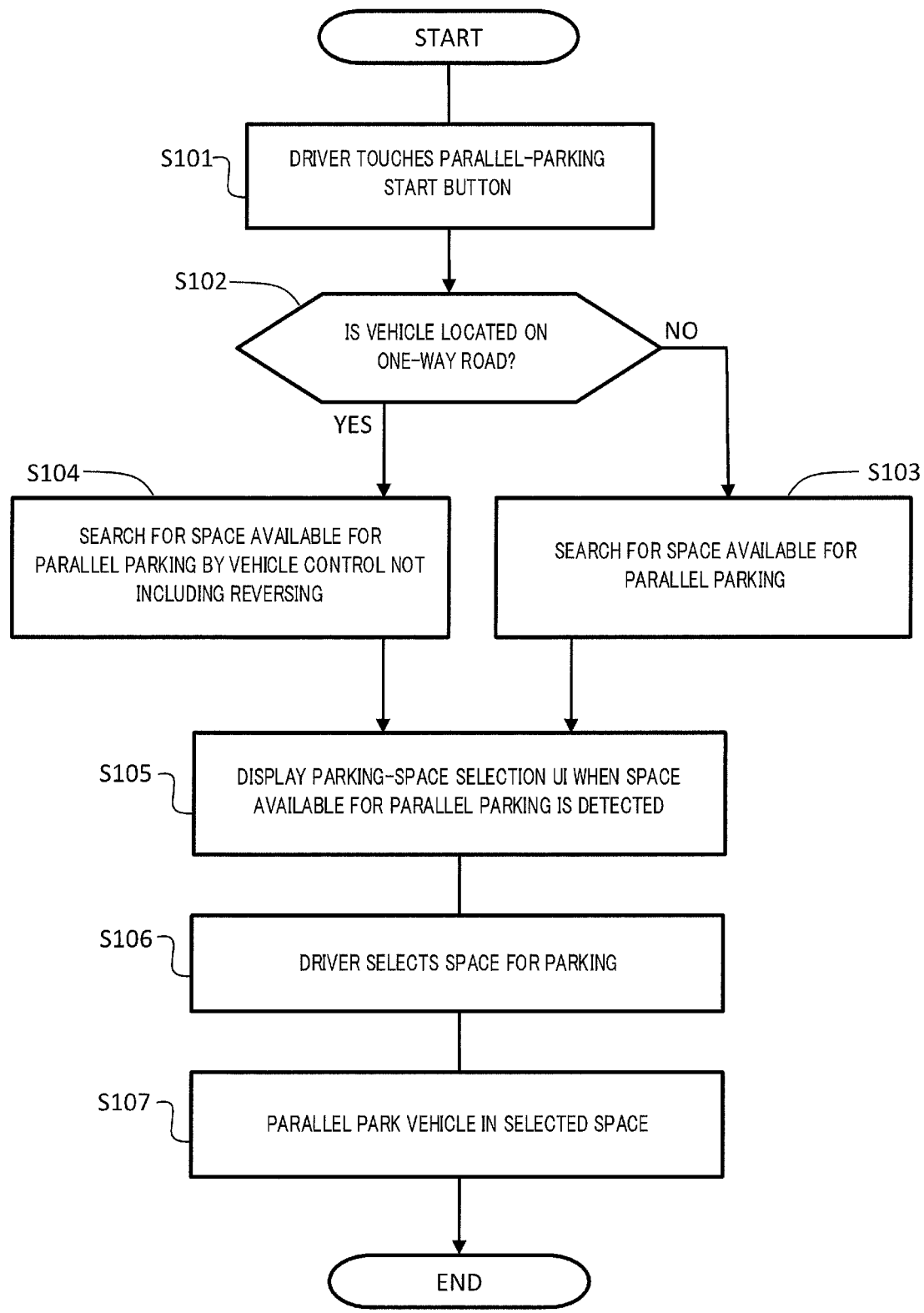
FIG. 2 is a flowchart illustrating an example of parallel parking processing according to the present embodiment.
Figure 3:
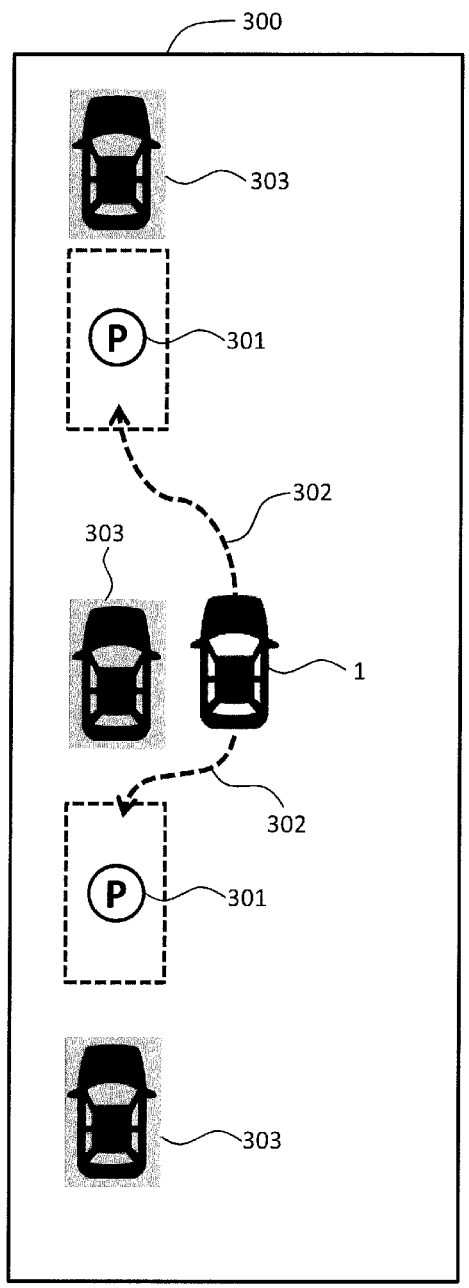
FIG. 3 illustrates a display example of a parking-space selection User Interface (UI) according to the present embodiment in a case where a vehicle is not located on a one-way road.

Additionally or alternatively, parking processor 102 may also display, on display apparatus 6, guidance information for guiding to a parking lot near vehicle 1 when no space available for parallel parking is successfully detected in the processing of S103 or S104 illustrated in FIG. 2. In this case, parking processor 102 may preferentially display, on display apparatus 6, the guidance information for guiding to a parking lot available for parking (e.g., a parking lot with an empty space) among nearby parking lots.

<Summary of Disclosure>

In the present disclosure, parking-assist ECU 10 includes: one-way traffic determiner 101 that determines whether or not vehicle 1 is located on the one-way road; and parking processor 102 that, when one-way traffic determiner 101 determines that vehicle 1 is located on the one-way road, does not perform the vehicle control for parallel parking including a path through which vehicle 1 reverses.

Accordingly, the vehicle control for parallel parking including the path through which vehicle 1 reverses is not performed when vehicle 1 is located on the one-way road, so that it is possible to assist in parallel parking appropriately depending on the road environment.

The present disclosure may be expressed as follows.

A parking assist apparatus according to the present disclosure includes: a one-way traffic determiner that determines whether or not a vehicle is located on a one-way road; and a parking processor that, when it is determined that the vehicle is located on the one-way road, does not perform a vehicle control for parallel parking including a path through which the vehicle reverses. It is thus possible to assist in parallel parking appropriately depending on the road environment since the vehicle control of autonomous parking including the path through which the vehicle reverses is not performed when the vehicle is located on the one-way road.

In addition, in the parking assist apparatus according to the present disclosure, when it is determined that the vehicle is located on the one-way road, the parking processor may search for a space available for parallel parking not including the path through which the vehicle reverses. It is thus possible for the driver to utilize assistance for parallel parking not including reversing of the vehicle on the one-way road.

In addition, the parking assist apparatus according to the present disclosure further includes a display processor that displays, on a displaying apparatus, a selection screen allowing a driver to select a space for which the parking assist apparatus is capable of assisting in the parallel parking, in which the parking processor searches for the space for which the parking assist apparatus is capable of assisting in the parallel parking, and, when it is determined that the vehicle is located on the one-way road, the display processor causes at least one of a plurality of the spaces not to be displayed or selectable, the plurality of spaces being those for which the parking assist apparatus is capable of assisting in the parallel parking, the at least one space being one for which the parking assist apparatus is capable of assisting in the parallel parking performed by the vehicle control including the path through which the vehicle reverses. It is thus possible to prevent the driver from selecting a parking space including the path through which the vehicle reverses on the one-way road.

In addition, in the parking assist apparatus according to the present disclosure, when it is determined that the vehicle is located on the one-way road, the display processor may display, on the displaying apparatus, that the road on which the vehicle is located is for one-way traffic. It is thus possible for the driver to recognize easily that the vehicle is located on the one-way road.

In addition, the parking assist apparatus according to the present disclosure may further include a notification processor that notifies that the vehicle control for parallel parking is not performed, when it is determined that the vehicle is located on the one-way road. It is thus possible for the driver to recognize from the voice that the vehicle control for parallel parking is not performed since the vehicle is located on the one-way road.

In addition, in the parking assist apparatus according to the present disclosure, when it is determined that the vehicle is located on the one-way road, the display processor may display a button that receives a start of the vehicle control for parallel parking, the button being displayed with an aspect indicating that the button is disabled. It is thus possible to prohibit the start of the vehicle control for parallel parking on the one-way road.

In addition, in the parking assist apparatus according to the present disclosure, the display processor may gray out the button, or display an icon indicating prohibition over the button for the aspect indicating that the button is disabled. It is thus possible to prohibit the start of the vehicle control for parallel parking. It is also possible for the driver to recognize that the start of the vehicle control for parallel parking is prohibited.

In addition, in the parking assist apparatus according to the present disclosure, when the space available for parallel parking not including the path through which the vehicle reverses is not detected successfully, the parking processor may display, on a displaying apparatus, guidance information for guiding to a parking lot available for parking. It is thus possible for the driver to easily move the vehicle to the parking lot available for parking.

In addition, a parking assist method according to the present disclosure includes steps performed by a parking assist apparatus of: determining whether or not a vehicle is located on a one-way road; and not performing a vehicle control for parallel parking including a path through which the vehicle reverses, when it is determined that the vehicle is located on the one-way road. It is thus possible to assist in parallel parking appropriately depending on the road environment since the vehicle control of autonomous parking including the path through which the vehicle reverses is not performed when the vehicle is located on the one-way road.

In addition, a computer program for parking assist according to the present disclosure causes a computer to execute processing of: determining whether or not a vehicle is located on a one-way road; and not performing a vehicle control for parallel parking including a path through which the vehicle reverses, when it is determined that the vehicle is located on the one-way road. It is thus possible to assist in parallel parking appropriately depending on the road environment since the vehicle control of autonomous parking including the path through which the vehicle reverses is not performed when the vehicle is located on the one-way road.

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system. Some non-limiting examples of such an apparatus include a phone (e.g., cellular (cell) phone, smart phone), a tablet, a personal computer (PC)

(e.g., laptop, desktop, notebook), a camera (e.g., digital still/video camera), a digital player (digital audio/video player), a wearable device e.g., wearable camera, smart watch, tracking device), a game console, and various combinations thereof.

While various embodiments have been described herein above, it is to be appreciated that various changes in form and detail may be made without departing from the sprit and scope of the invention(s) presently or hereafter claimed.

This application is entitled and claims the benefit of Japanese Patent Application No. 2018-242432, filed on Dec. 26, 2018, the disclosure of which including the specification, drawings and abstract is incorporated herein by reference in its entirety.

INDUSTRIAL APPLICABILITY

One aspect of the present disclosure is useful for driving assistance of a vehicle.

REFERENCE SIGNS LIST

1 Vehicle
2 In-vehicle system
3 Map information processor
4 Sensor apparatus
5 Camera apparatus
6 Display apparatus
7 Vehicle-control ECU
8 Speaker
10 Parking-assist ECU
11 Communication I/F
12 Memory
13 Processor
14 Internal bus
101 One-way traffic determiner
102 Parking processor
103 UI processor
104 Notification processor
300 Parking-space selection UI
301 Parking-allowance mark
302 Travel path
303 Parked vehicle
305 Parking-prohibition mark
306 One-way traffic mark
400 Operation screen
401 Parallel-parking start button
402 Selection prohibition icon

The invention claimed is:

1. A parking assist apparatus associated with a vehicle, comprising:
a one-way traffic determiner that determines whether or not the vehicle is located on a one-way road based on road information from a map information processor installed in the vehicle or a captured image from a camera apparatus installed in the vehicle; and
a parking processor that judges not to perform a vehicle control for parallel parking including a path through which the vehicle reverses when the one-way traffic determiner determines that the vehicle is located on the one-way road.

2. The parking assist apparatus according to claim 1, wherein,
when the one-way traffic determiner determines that the vehicle is located on the one-way road, the parking processor searches for a space available for parallel parking not including the path through which the vehicle reverses.

3. The parking assist apparatus according to claim 1, further comprising:
a display processor that displays, on a displaying apparatus of the vehicle, a selection screen allowing a driver of the vehicle to select a space for which the parking assist apparatus is capable of assisting in the parallel parking,
wherein the parking processor searches for the space for which the parking assist apparatus is capable of assisting in the parallel parking, and
when the one-way traffic determiner determines that the vehicle is located on the one-way road, the display processor causes at least one space of a plurality of the spaces not to be displayed or selectable, the plurality of spaces being those for which the parking assist apparatus is capable of assisting in the parallel parking, the at least one space being one for which the parking assist apparatus is capable of assisting in the parallel parking performed by the vehicle control including the path through which the vehicle reverses.

4. The parking assist apparatus according to claim 3, wherein,
when the one-way traffic determiner determines that the vehicle is located on the one-way road, the display processor displays, on the displaying apparatus, that the road on which the vehicle is located is for one-way traffic.

5. The parking assist apparatus according to claim 3, wherein,
when one of the plurality of spaces displayed on the displaying apparatus is selected, the parking processor controls the vehicle such that the vehicle is parallel parked in the selected space.

6. The parking assist apparatus according to claim 1, further comprising:
a notification processor that notifies that the vehicle control for parallel parking is not performed, when the one-way traffic determiner determines that the vehicle is located on the one-way road.

7. The parking assist apparatus according to claim 3, wherein, when the one-way traffic determiner determines that the vehicle is located on the one-way road, the display processor displays a button that receives a start of the vehicle control for parallel parking, the button being displayed with an aspect indicating that the button is disabled.

8. The parking assist apparatus according to claim 7, wherein
the display processor grays out the button, or displays an icon indicating prohibition over the button for the aspect indicating that the button is disabled.

9. The parking assist apparatus according to claim 2, wherein, when the space available for parallel parking not including the path through which the vehicle reverses is not detected successfully, the parking processor displays, on a displaying apparatus of the vehicle, guidance information for guiding the vehicle to a parking lot available for parking.

10. A parking assist method performed by a parking assist apparatus associated with a vehicle, the parking assist method comprising steps of:
determining, by a one-way traffic determiner of the parking assist apparatus, whether or not the vehicle is located on a one-way road based on road information from a map information processor installed in the vehicle or a captured image from a camera apparatus installed in the vehicle; and not performing, by a parking processor of the parking assist apparatus, a vehicle control for parallel parking including a path through which the vehicle reverses, when the one-way traffic determiner determines that the vehicle is located on the one-way road.

11. The parking assist method according to claim 10, wherein, when the one-way traffic determiner determines that the vehicle is located on the one-way road, a space available for parallel parking not including the path through which the vehicle reverses is searched for.

12. The parking assist method according to claim 10, wherein:

a space for which the parking assist apparatus is capable of assisting in the parallel parking is searched for, and a selection screen allowing a driver of the vehicle to select the space for which the parking assist apparatus is capable of assisting in the parallel parking is displayed on a displaying apparatus of the vehicle when the one-way traffic determiner determines that the vehicle is located on the one-way road, the selection screen being displayed in a state where a space for which the parking assist apparatus is capable of assisting in the parallel parking performed by the vehicle control including the path through which the vehicle reverses is caused not to be displayed or selectable.

13. The parking assist method according to claim 12, wherein, when the one-way traffic determiner determines that the vehicle is located on the one-way road, the displaying apparatus displays that the road on which the vehicle is located is for one-way traffic.

14. The parking assist method according to claim 12, wherein, when one of a plurality of the spaces displayed on the displaying apparatus is selected, the vehicle is controlled such that the vehicle is parallel parked in the selected space.

15. The parking assist method according to claim 10, wherein, when the one-way traffic determiner determines that the vehicle is located on the one-way road, a notification of not performing the vehicle control for parallel parking is given.

16. The parking assist method according to claim 12, wherein, when the one-way traffic determiner determines that the vehicle is located on the one-way road, a button that receives a start of the vehicle control for parallel parking is displayed with an aspect indicating that the button is disabled.

17. The parking assist method according to claim 16, wherein the button is grayed out, or an icon indicating prohibition is displayed over the button for the aspect indicating that the button is disabled.

18. The parking assist method according to claim 11, wherein, when the space available for parallel parking not including the path through which the vehicle reverses is not detected successfully, guidance information for guiding the vehicle to a parking lot available for parking is displayed on a displaying apparatus of the vehicle.

\* \* \* \* \*